United States Patent [19]

Bennett

[11] 4,327,600
[45] May 4, 1982

[54] REMOTE CONTROL (CONNECTOR O-RING)

[75] Inventor: William G. Bennett, Troy, Mich.

[73] Assignee: Teleflex Incorporated, Limerick, Pa.

[21] Appl. No.: 155,457

[22] Filed: Jun. 2, 1980

[51] Int. Cl.³ .................................................. F16C 1/14
[52] U.S. Cl. .................................. 74/501 R; 74/501 P
[58] Field of Search ...................... 74/501 P, 502, 503,
74/501 R; 277/152, 165; 192/30 V; 248/559;
188/378

[56] References Cited

U.S. PATENT DOCUMENTS

| | | | |
|---|---|---|---|
| 2,486,098 | 10/1949 | Batterson | 74/503 |
| 3,076,668 | 2/1963 | Famely | |
| 3,164,054 | 1/1965 | Biesecker | |
| 3,348,427 | 10/1967 | Wilkey | 74/501 P |
| 3,516,299 | 6/1970 | Conrad | 74/501 P |
| 4,017,961 | 4/1977 | Kochte et al. | 74/503 |
| 4,079,950 | 3/1978 | Langford | 74/502 |
| 4,266,439 | 5/1981 | Hayashi et al. | 74/501 R |

FOREIGN PATENT DOCUMENTS 1224692  5/1959  France ............................... 74/501 P

*Primary Examiner*—Kenneth Dorner
*Attorney, Agent, or Firm*—McGlynn and Milton

[57] ABSTRACT

A motion transmitting remote control assembly of the type for transmitting motion in a curved path by a flexible motion transmitting core element including a flexible motion transmitting core element, a guide assembly for supporting the core element such that the ends of the core element extend from the guide assembly, a terminal disposed on one end of the core element and having first and second faces with an aperture extending therebetween for receiving a control member, and an incompressible fitting retained in the aperture having a passageway extending therethrough for surrounding the control member. The assembly is characterized by a resilient member disposed in the passageway for cushioning the control member from the terminal to inhibit the transmission of vibrations between the terminal and the control member.

8 Claims, 3 Drawing Figures

U.S. Patent    May 4, 1982    4,327,600
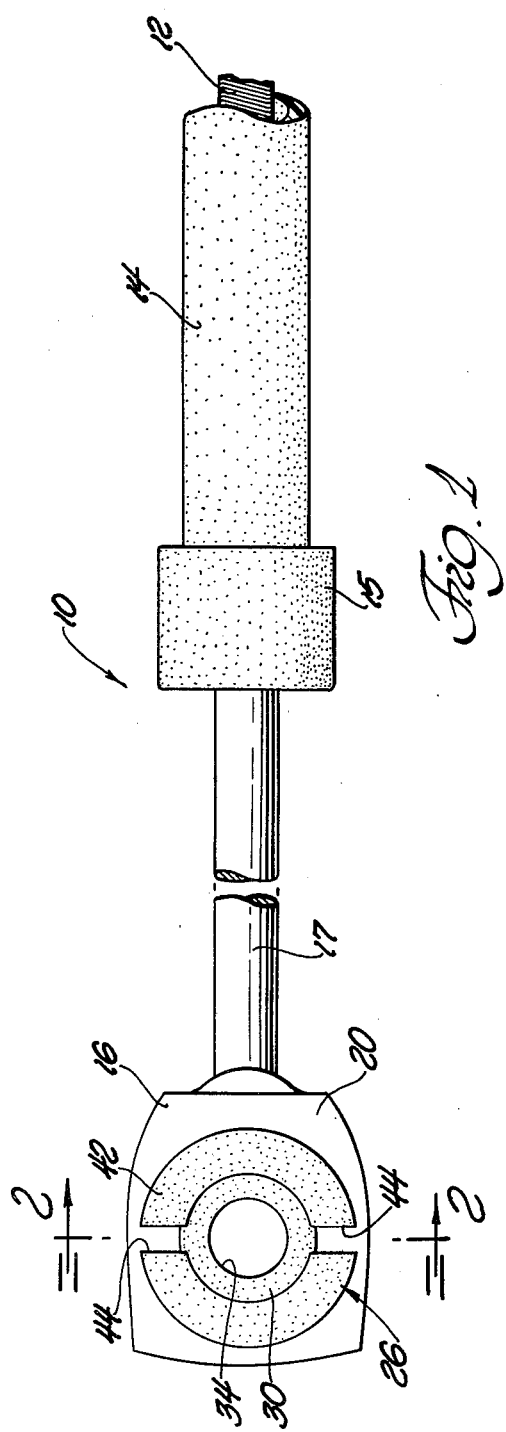
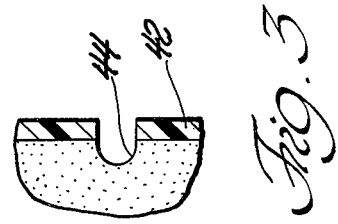
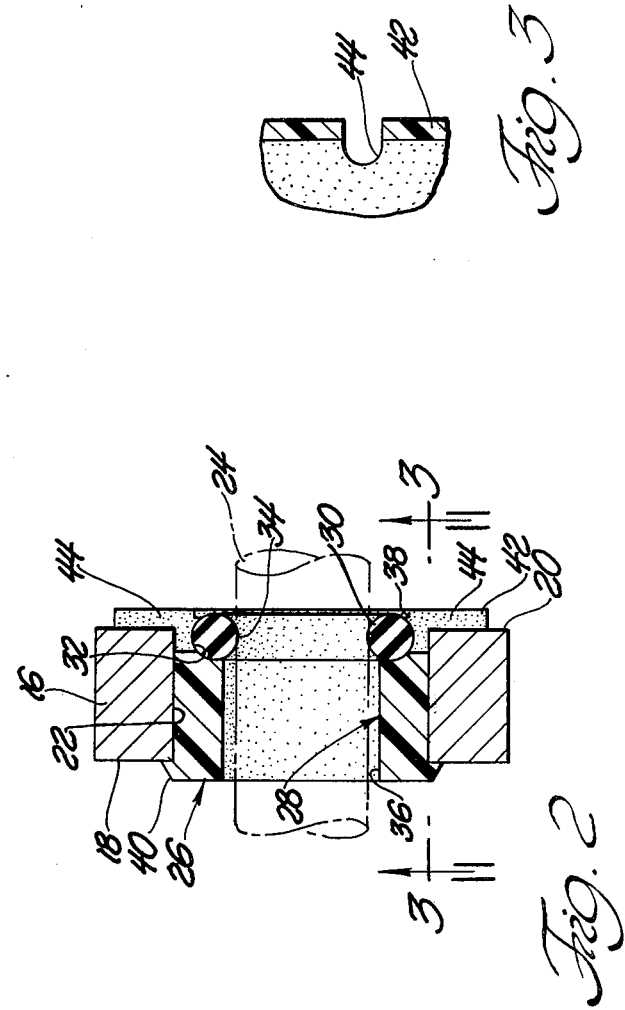

4,327,600

REMOTE CONTROL (CONNECTOR O-RING)

BACKGROUND OF THE INVENTION (1) Field of the Invention

The subject invention relates to a motion transmitting remote control assembly of the type for transmitting motion in a curved path by a flexible motion transmitting core element. The assembly is of the type which includes a core element terminal having an aperture therethrough for retaining a cylindrical member or projection from a control member such as a lever or other similar actuating device.

(2) Description of the Prior Art

Core element terminals for remote control assemblies have been constructed in various shapes for various purposes. Generally, some terminals include a body or shank portion connected to an enlarged head with an eyelet or aperture for receiving a control member, however, a problem arises when vibrations from the control member are transmitted to and through the motion transmitting remote control assembly. The result is annoying noises which, in a motor vehicle, can be quite conspicuous and annoying to the passengers within the vehicle.

SUMMARY OF THE INVENTION

A motion transmitting remote control assembly of the type for transmitting motion in a curved path by a flexible motion transmitting core element includes a flexable motion transmitting core element, a guide assembly for movably supporting the core element with the ends of the core element extending from the guide assembly, and a terminal disposed on one end of the core element. The terminal includes first and second faces with an aperture extending between the faces for receiving a control member. The assembly also includes an incompressible fitting retained in the aperture and having a passageway extending therethrough for surrounding the control member, characterized by a resilient member disposed in the passageway for cushioning the control member from the terminal to inhibit the transmission of vibrations between the terminal and the control member.

PRIOR ART STATEMENT

The U.S. Pat. Nos. 3,076,668 to Famely issued Feb. 5, 1963 and 3,164,054 to Biesecker issued Jan. 5, 1965 are examples of connector fittings. Both prior art patents teach fittings of the type retained within an aperture of a support member and include a passageway for receiving the control member in the form of a pin or cylindrical member. However, neither patent teaches a means for dampening vibrations which are passed from the support member via the fitting to the pin member or vice versa.

BRIEF DESCRIPTION OF THE DRAWINGS

FIG. 1 is a fragmentary elevational view of the subject invention;

FIG. 2 is a cross-sectional view of the subject invention taken substantially along lines 2—2 of FIG. 1;

FIG. 3 is a cross-sectional fragmentary view of the subject invention taken substantially along line 3—3 of FIG. 2.

DESCRIPTION OF PREFERRED EMBODIMENT

A motion transmitting remote control assembly of the type for transmitting motion in a curved path by a flexible motion transmitting core element constructed in accordance with the instant invention is generally shown at 10 in FIG. 1.

The assembly 10 includes a flexible motion transmitting core element 12. Guide means 14 movably supports the core element 12. The ends of the core element 12 extend from the guide means 14. The guide means generally includes a conduit 14 and end fitting 15. However, alternative embodiments of the instant invention may include a rigid terminal member at 14 and a wiper member at 15 secured to the rigid end piece member 14. The conduit is of the type well known in the art including an inner plastic tube surrounded by long lay helically disposed wires surrounded by a plastic casing.

A terminal 16 is disposed on one end of the core element 12. In the preferred embodiment shown in FIG. 1, the terminal 16 includes a rigid bar member 17 connected to the core element 12 by conventional means well known in the art, such as swaging. The terminal 16 includes first and second faces 18, 20 with an aperture 22 extending between the faces 18 and 20.

As shown in FIG. 2, the aperture 22 receives a control member 24. The control member 24 may be a pin extending perpendicularly from a lever or a shaft of a lever or any other member which may actuate or be actuated by the core element 12 via the terminal 16.

The assembly includes an incompressible fitting generally indicated at 26. As shown in FIG. 2, the fitting 26 is retained in the aperture 22. The fitting 26 includes a passageway generally indicated at 28 extending therethrough for surrounding the control member 24. The assembly 10 is characterized by a resilient means 30 disposed in the passageway 28 for cushioning the control member 24 from the terminal 16 to inhibit the transmission of vibrations between the terminal 16 and the control member 24. In other words, vibrations originating in the control member 24 are absorbed and diminished within the resilient means 30 and therefore are not transmitted via the fitting 26 to the terminal 16 and vice versa. The result is a decrease in bothersome and annoying vibrations transmitted to the core element 12 and to other elements of the motion transmitting assembly 10 and vice versa. Of course, when the control member is moved, the resilient means 30 compresses and the control member 24 contacts the fitting 26.

The fitting 26 includes an annular groove 32 in the passageway 28. The resilient means 30 comprises an O-ring disposed in the groove 32. The O-ring has an inner diameter smaller than the passageway 28. Therefore, the control member 24 is engaged by the resilient means 30 to a substantial extent as opposed to coming in contact with the passageway 28 during the non-actuating mode.

The fitting 26 has first and second ends. The passageway 28 includes a first portion 36 extending between the groove 32 and the first end of the fitting 30. The passageway also includes a second portion 38 extending between the groove 32 and the second end of the fitting 30. The second portion 38 of the passageway 28 has a larger diameter than the first portion 36 for facilitating insertion of the O-ring 30 into the groove 32. To further explain, the fitting 26 and the O-ring 30 are made separately. The fitting 36 is molded from an incompressible organic polymeric material. The resilient plastic O-ring 30 is then inserted into the groove 32. The second portion 38 of the passageway 28 has a larger diameter than the first portion 36 of the passageway 28 to facilitate this assembly.

The second portion 38 of the passageway 28 has a smaller diameter than the largest diameter of the groove 36. In other words, the groove 36 is recessed into the passageway 28 to a greater extent than the difference between the diameters of the first and second portions. Therefore, the largest diameter of the groove 36 is recessed in comparison to the diameter of the first portion 36 of the passageway 28 to a greater extent than the diameter of the second portion 38 of the passageway 28 compared to the diameter of the first portion 36 of the passageway 28.

The fitting 26 includes at least one slot 44 disposed in the second end thereof. The slot 44 extends radially from the groove 36 to the radial extremity of the second end. The reason for this construction involves the molding process of the fitting 26. Once the piece is molded, the slot 44 allows the portion of the mold defining the groove 32 to snap out or be released from the groove 32. An other words, the slot 44 allows sufficient flexibility of the second end of the fitting 26 to allow that portion of the mold defining the slot 32 and engaged within the slot 32 to be snapped out and released from the slot without damaging the end portion structure of the fitting 26.

The first end of the fitting includes an annularly extending tapered shoulder 40 for allowing the fitting 26 to be snapped into the aperture 22. The shoulder 40 abuts the first face 18 of the terminal 16 about the aperture 22 and thereby retains the fitting 26 in the aperture 22.

The fitting 26 has a radially extending flange 42 at the second end thereof engaging the second face 20 of the terminal 16 about the aperture 22 therein. In other words, the flange 42 provides an abutment against which the face 20 of the terminal 16 abuts thereby limiting the entrance of the fitting 10 into the aperture 22.

In the preferred embodiment, as shown in FIG. 2, the groove 32 is semi-circular in cross section and the O-ring is circular in cross section. In alternative embodiments the O-ring and groove may be constructed in alternative shapes and still function in accordance with the instant invention.

The inventin has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

The embodiments of the invention in which an exclusive property or privilege is claimed are defined as follows:

1. A motion transmitting remote control assembly (10) of the type for transmitting motion in a curved path by a flexible motion transmitting core element, said assembly (10) comprising; a flexible motion transmitting core element (12), guide means (14) for movably supporting said core element (12) with the ends of said core element (12) extending from said guide means (14), a terminal (16) disposed on one end of said core element (12) and having first (18) and second (20) faces with an aperture (22) extending between said faces (18, 20) for receiving a control member (24), an incompressible fitting (26) retained in said aperture (22) and having a passageway (28) extending therethrough for surrounding the control member (24), characterized by resilient means (30) disposed in said passageway (28) for cushioning the control member (24) from said terminal (16) to inhibit the transmission of vibrations between said terminal (16) and the control member (24).

2. An assembly as set forth in claim 1 wherein said fitting (26) includes an annular groove (32) in said passageway (28) and said resilient means (30) comprises an O-ring disposed in said groove (32), said O-ring having an inner diameter smaller than said passageway (28).

3. An assembly as set forth in claim 2 wherein said fitting (26) has first and second ends, said passageway (28) having a first portion (36) extending between said groove (32) and said first end and a second portion (38) extending between said groove (32) and said second end, said second portion (38) having a larger diameter than said first portion (36) for facilitating insertion of said O-ring (30) into said groove (32).

4. An assembly as set forth in claim 3 wherein said second portion (38) of said passageway (28) has a smaller diameter than the largest diameter of said groove (32).

5. An assembly as set forth in claim 4 wherein said fitting (26) includes at least one slot (44) disposed in said second end thereof and extending radially from said groove (36) to the radial extremity of said second end.

6. An assembly as set forth in claim 5 wherein said first end of said fitting includes an annularly extending tapered shoulder (40) for allowing said fitting (26) to be snapped into said aperture (22) with said shoulder (40) abutting said first face (18) of said terminal (16) about said aperture therein and for retaining said fitting (36) in said aperture (22), said fitting (26) having a radially extending flange (42) at said second end thereof engaging said second face (20) of said terminal (16) about said aperture (22) therein.

7. An assembly as set forth in claim 6 wherein said groove (32) is semi-circular in cross section and said O-ring is circular in cross section.

8. An assembly as set forth in claim 7 wherein said fitting (26) is made from an organic polymeric material.

* * * * *